United States Patent Office 3,655,765
Patented Apr. 11, 1972

3,655,765
HALOGEN CONTAINING KETONES, ACID HALIDES AND PROCESSES
Samuel Gelfand, Niagara Falls, N.Y., assignor to Hooker Chemical Corporation, Niagara Falls, N.Y.
No Drawing. Continuation-in-part of application Ser. No. 306,278, Sept. 3, 1963, which is a continuation-in-part of application Ser. No. 157,007, Dec. 4, 1961. This application Feb. 15, 1968, Ser. No. 705,615
Int. Cl. C07c 49/28, 49/00
U.S. Cl. 260—586 R        2 Claims

ABSTRACT OF THE DISCLOSURE

There are provided novel halogenated ketones of the formulae $$Y-\underset{X}{\underset{|}{C}}-\underset{R^1}{\underset{|}{C}}=O \quad \text{and} \quad Y-\underset{X}{\underset{|}{C}}-\overset{\lceil R^3 \rceil}{\underset{\lfloor \phantom{R^3} \rfloor}{C}}=O$$

(1)                    (2)

wherein

X is selected from the group consisting of chlorine bromine, fluorine and hydrogen;
R¹ is selected from the group consisting of hydrogen, chlorine, bromine, fluorine and halo alkyl;
R² is halo alkyl;
R³ is halo alkylene of from three to four carbon atoms; and
Y is allyl;

said R¹, R² and R³ substituents containing a maximum of two hydrogen atoms. These ketones are useful as pesticides. There is also provided a process for preparing these ketones comprising heating a compound of the formulae $$\underset{X}{\underset{|}{\overset{R^1}{\underset{|}{C}}}}=\underset{O-Y}{\underset{|}{\overset{R^2}{\underset{|}{C}}}} \quad \text{and} \quad \underset{X}{\underset{|}{\overset{\lceil R^3 \rceil}{\underset{\lfloor \phantom{R^3} \rfloor}{C}}}}=\underset{O-Y}{\underset{|}{C}}$$

until the desired compound is produced. The ketones of this invention are useful as chemical intermediates for example, in the making of Diels-Alder adducts with hexahalocyclopentadiene, to produce pesticidal compounds active against insects, fungi, bacteria and nematodes. They are also useful as olefinic monomers which may be polymerized to moldable plastics which exhibit flame retardant characteristics.

---

This is a continuation in part of Ser. No. 306,278, filed Sept. 3, 1963, which was a continuation in part of Ser. No. 157,007, filed Dec. 4, 1961, now abandoned.

This invention relates to a novel process for producing halogen-containing ketones or acid halides and new ketones or acid halides produced therefrom.

In accordance with the present invention, novel halogen-containing carbonyl compounds can be produced by heating a compound of the Formulas A and B as represented by Equations 1 and 2 shown below until the desired product results:

(1)
$$\underset{X}{\underset{|}{\overset{R^1}{\underset{|}{C}}}}=\underset{|}{\overset{R^2}{\underset{|}{C}}}-O-Y \longrightarrow Y-\underset{X}{\underset{|}{\overset{R^1}{\underset{|}{C}}}}-\underset{|}{\overset{R^2}{\underset{|}{C}}}=O$$
(A)

and (2)
$$\underset{X}{\underset{|}{\overset{\lceil R^3 \rceil}{\underset{\lfloor \phantom{} \rfloor}{C}}}}=\underset{|}{\underset{|}{C}}-O-Y \longrightarrow Y-\underset{X}{\underset{|}{\overset{\lceil R^3 \rceil}{\underset{\lfloor \phantom{} \rfloor}{C}}}}-\underset{|}{C}=O$$
(B)

wherein the substituents:

X is selected from the group consisting of halogen, such as chlorine, bromine, fluorine and hydrogen;
R¹ is selected from the group consisting of hydrogen, chlorine, bromine, fluorine, and halo alkyl, preferably of one to eight carbon atoms;
R² is halo alkyl, preferably of one to eight carbon atoms;
R³ is halo alkylene of from three to four carbon atoms; and Y is allyl;

said R¹, R² and R³ substituents containing a maximum of two hydrogen atoms.

Illustrative examples of such alicyclic starting compounds include 2-chloro-1,3,3,3-tetrafluoro-propen-1-yl allyl ether;
perfluorodecen-5-yl allyl ether;
perfluorooctadecen-9-yl allyl ether;
perfluoroocten-2-yl allyl ether;
1,1,1,4,4,5,5,5-octafluoropenten-2-yl-2-allyl ether;
1,1,1-trifluoro-3,4,4,4-tetrachlorobuten-2-yl allyl ether;
1,1,1,4,4,4-hexafluorobuten-2-yl allyl ether;
2-bromo-1,1,1,4,4,4-hexafluorobuten-2-yl allyl ether;
1,2,4-trichloro-1,1,4,4-tetrafluorobuten-2-yl allyl ether;
2-chloro-1,1,4,4-tetrafluorobuten-2-yl allyl ether;
1,1,1,4-tetrachloro-4,4-difluorobuten-2-yl-2-allyl ether;
1,2-dichloro-3,3,4,4-pentafluorobuten-1-yl-1-allyl ether;
1-chloro-1,3,3,4,4,4-hexafluorobuten-1-yl-2-allyl ether;
1-chloro-1,3,3,3-tetrafluoropropen-1-yl-2-allyl ether, etc.

Illustrative examples of such cyclic starting materials are:

2,4,4-trichloro-3,3,5,5-tetrafluorocyclopenten-1-yl allyl ether;
2,3,5-trichloro-3,5,4,4-tetrafluorocyclopenten-1-yl-1-allyl ether;
tetrachlorotrifluorocyclopenten-1-yl-1-allyl ether;
2-chlorooctafluorocyclohexen-1-yl allyl ether;
perfluorocyclohexen-1-yl allyl ether;
3,3,4,4,5,5-hexafluorocyclopenten-1-yl allyl ether;
perfluorocyclopentene-1-yl allyl ether;
3,3,4,4,5,5,6,6-octafluorocyclohexen-1-yl allyl ether;
2-bromo-octafluorocyclohexen-1-yl allyl ether;
1-perfluorocyclohexen-1-yl allyl ether;
1,3,3,4,4,5,5,6-octafluorocyclohexene-1-yl-2-allyl ether;
3,3,4,4,5,5,6-heptafluorocyclohexene-1-yl-2-allyl ether; etc.

In addition, acid halides or derivatives thereof may be formed from the rearrangements of compounds of a class having the same formula as described above, except that R² would be chloro-, bromo- or fluoro-. Similarly, aldehydes may be formed from the rearrangements of compounds of a class having the same formula as described above, except that R² would be hydrogen.

The allyl ether compounds can be produced by reacting an allyl alcohol in the presence of a basic material or an alkaline condensation agent with compounds having the general formulas:

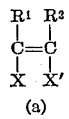

(a)

and

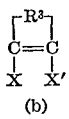

(b)

wherein the substituents: X and X' are selected from the group consisting of chlorine, bromine, fluorine and hydrogen; and the remaining substituents $R^1$, $R^2$, $R^3$ and Y are as described above.

Illustrative examples of alicyclic materials which may be used to prepare the ether are:

1,2-dichloro-1,3,3,3-tetrafluoropropene-1;
perfluorodecene-5;
perfluorooctadecene-9;
perfluoroctene-2;
1,1,1,3,4,4,5,5,5-nonafluoropentene-2;
1,1,1,2-tetrachloro-3,4,4,4-tetrafluorobutene-2;
1,1,1,2,3-pentachloro-4,4,4-trifluorobutene-2;
1,1,1-trichloro-2,3,4,4,4-pentafluorobutene-2;
2-bromo-1,1,1,4,4,4-hexafluorobutene-2;
1,2,3,4-tetrachloro-1,1,4,4-tetrafluorobutene-2;
2,3-dichlorohexafluorobutene-2;
2-chloroheptafluorobutene-2;
perfluorobutene-2; etc.

Illustrative examples of cyclic materials which may be used to prepare the ethers are:

1,2-dichlorohexafluorocyclopentene-1;
1-chloroheptafluorocyclopentene-1;
1-chloro-3,3,4,4,5,5-hexafluorocyclo-pentene-1;
octafluoro-cyclopentene-1;
2,3,3,4,4,5,5-heptafluorocyclopentene-1;
1,2,4,4-tetrachlorotetrafluorocyclopentene-1;
1,2,3,3-tetrachlorotetrafluorocyclopentene-1;
tetrachlorotrifluorocyclopentene;
2-chlorononafluorocyclohexene-1;
1,2-dichlorooctafluorocyclohexene-1;
perfluorocyclohexene;
1-chloro-3,3,4,4,5,5,6,6-octafluorocyclohexene;
2,3,3,4,4,5,5,6,6-nonafluorocyclohexene-1; etc.

The allyl ether compounds can also be produced by other methods, such as by addition of allyl alcohols to properly substituted acetylenic compounds. For instance, hexafluorobutyne-2 will react with allyl alcohol to form the desired 1,1,1,4,4,4-hexafluorobuten-2-yl allyl ether.

Therefore, the invention is not to be limited to the way in which the allyl ether is prepared, except as defined in the appended claims.

The allyl alcohol to be used in the process of this invention has the general formula:

$$ZHC=CH-CH_2OH$$

wherein Z is hydrogen, phenyl substituted by halogen, alkoxy and other substituents such as cyano, nitro, alkyl and the like.

Examples of such alcohols are allyl alcohol, methallyl alcohol, cinnamyl alcohol, and the like.

The preferred basic material to use is an aqueous alkali metal or alkaline earth hydroxide, such as sodium hydroxide, potassium hydroxide, lithium hydroxide, and calcium hydroxide. Other bases may also be used, such as ammonium hydroxide, benzyl trimethyl ammonium hydroxide, sodium metal, potassium metal, and alkali metal alkoxides such as sodium alkoxide.

The allyl alcohol and unsaturated compound react in a one to one molar ratio. It is preferred to use an excess of allyl alcohol in order to react more completely with the unsaturated material.

The mechanism of the reaction is not understood. It may rearrange intramolecularly as illustratively depicted below:

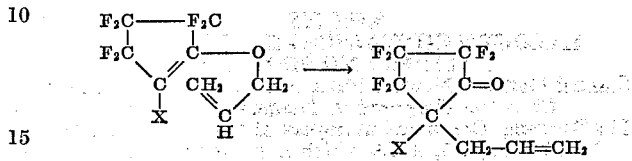

Another possible mechanism of the reaction in the above compound is for the allyl ether group of one molecule to react intermolecularly with the 2-carbon atom of another molecule of the same compound. However, it is to be understood that this invention is not limited to any reaction theory, except as described in the appended claims.

The rearrangement proceeds readily in the liquid phase at moderately elevated temperatures. Temperatures between fifty degrees centigrade and about two hundred degrees centigrade may be used. However, temperatures between about seventy degrees and about one hundred and thirty degrees centigrade are preferred.

The reaction can be carried out in the liquid phase or vapor phase. Refluxing conditions have been found particularly suitable. While elevated and reduced pressures may be used, it is preferred to use atmospheric conditions.

The reaction is advantageously carried out without the use of a solvent. However, a suitable solvent may be used in some circumstances where it may be desirable to do so. Examples of such solvents are dimethylformamide. dioxane, dimethoxyethane, toluene and the like.

The time of reaction should be sufficiently long to effect the desired reaction, and may be varied within wide limits. At more elevated temperatures, the reaction rate increases.

The novel ketones of this invention are useful as chemical intermediates for organic synthesis, for example, in the making of the Diels-Alder adduct by the 1,4 addition of the novel ketones of this invention to a conjugated diene, such as hexahalocyclopentadiene, wherein the halogen is selected from the group consisting of chlorine, bromine, fluorine and iodine. The Diels-Alder reaction is generally accomplished at a temperature of from 30 degrees centigrade to about 200 degrees centigrade, but the temperature of the reaction will, of course, depend on the solvent employed, as the reaction is normally accomplished at the reflux temperature of the solvent. A discussion of the Diels-Alder reaction, wherein reaction conditions are disclosed, is in British Pats. 614,931 and 701,211.

By the reaction of the novel ketones of this invention with hexachlorocyclopentadiene the following Diels-Alder adducts may be prepared:

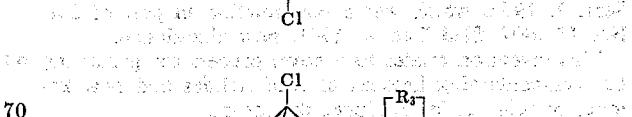

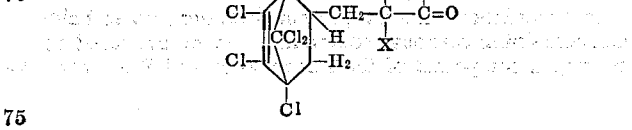

In such compounds, X is selected from the group consisting of halogen, such as chlorine, bromine, fluorine, and hydrogen; R¹ is selected from the group consisting of hydrogen, chlorine, bromine, fluorine, and haloalkyl; R² is haloalkyl, preferably of one to eight carbon atoms; and R³ is haloalkylene of from three to four carbon atoms. These Diels-Alder adducts are particularly useful for the control of animal or plant pests. They possess certain insecticidal activity such as toxicity toward mites and the like, and they are active against various microorganisms such as fungi, bacteria, nematodes and the like.

The pesticidal preparations containing the Diels-Alder adducts are conveniently made up as liquid or as solid formulations. Examples of solid formulations are dusts, wettable powders, granules and pellets, which may contain a solid extender or carrier, such as sand, clays, talcs, sawdust and the like. Where liquid formulations are desirable, liquid extenders, diluents, or carriers of a non-reactive nature are generally utilized, such as water, alcohols, glycols, petroleum distillates, and the like.

Pesticidal preparations containing the following Diels-Alder adduct:

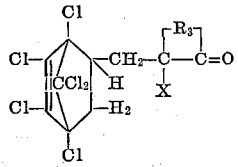

wherein X is selected from the group consisting of halogen, such as chlorine, bromine, fluorine, and hydrogen, and R³ is haloalkylene of from three to four carbon atoms, kill mites when sprayed, dusted or spread on them in compositions containing small percentages, e.g., 1 percent to 2 percent of the Diels-Alder adduct. Other Diels-Alder adducts, such as those of the following formula:

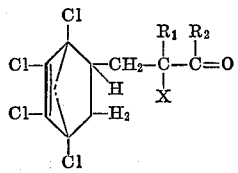

wherein R¹ is selected from the group consisting of hydrogen, chlorine, bromine, fluorine, and haloalkyl, and R² is a haloalkyl preferably of one to eight carbon atoms, result in a similar percent mortality when sprayed, dusted, or spread on mites, houseflies, and other common house and garden insects such as spiders, ants, roaches, and the like in comparable concentrations.

The novel compounds of the present invention are also useful as olefinic monomers for use in polymerizing, i.e., in making vinyl polymers, both as a homopolymer or in a copolymer with other vinyl monomers such as ethylene, propylene, styrene and the like. The various homopolymers which can be prepared are represented by the following formulae:

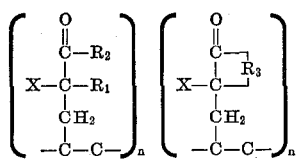

wherein X is selected from the group consisting of halogen, such as chlorine, bromine, fluorine and hydrogen: wherein R¹ is selected from the group consisting of hydrogen, chlorine, bromine, fluorine, and hydrogen; wherein R² is haloalkyl preferably of one to eight carbon atoms; and wherein R³ is haloalkylene of from three to four carbon atoms. The copolymers formed from the ketones of the present invention may be molded into various shapes. The copolymers formed from the highly halogenated ketones of the present invention exhibit improved flame retardant characteristics.

The novel ketones of this invention are useful as chemical intermediates for organic synthesis, such as, for example, in the making of the Diels-Alder adduct with hexahalocyclopentadiene, wherein the halogen is selected from the group consisting of chlorine, bromine, fluoride and iodine. For example, the Diels-Alder adduct of the compound represented by the formula $(C_8F_6ClOH_5)$ with hexachlorocyclopentadiene is a compound of the formula $C_{13}Cl_7F_6OH_5$

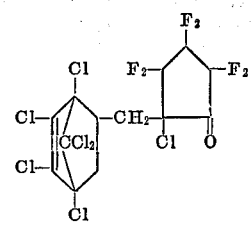

which finds utility as a pesticide, as will be more fully demonstrated in the working examples.

The novel compounds of the present invention are also useful as olefinic monomers for use in polymerization, i.e., in making vinyl polymers, both as a homopolymer or in a copolymer with other vinyl monomers such as ethylene, propylene, styrene and the like. A homopolymer which can be prepared, for example, is represented by the formula:

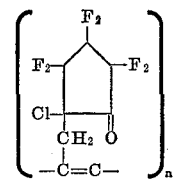

wherein $n$ is an integer.

The polymerization is generally effected in the presence of free radical initiators such as peroxides, and at a temperature of from forty degrees centigrade to about one hundred and twenty degrees centigrade. Other polymerization techniques useful for polymerizing vinyl monomers can also be used.

The Diels-Alder synthesis (or Diene synthesis) as herein referred to comprises the 1,4 addition of the novel ketones of this invention to a conjugated diene such as hexahalocyclopentadiene.

The Diels-Alder reaction is generally accomplished at a temperature of from 30 degrees centigrade to about 200 degrees centigrade, but the temperature of the reaction will, of course, depend on the solvent employed, as the reaction is normally accomplished at the reflux temperature of the solvent. A discussion of the Diels-Alder reaction, wherein reaction conditions are disclosed can be located in British Pats. 614,931 and 701,211.

The following examples are preferred embodiments of this invention, but are not to be construed as limiting, except as defined in the appended claims.

EXAMPLE 1

2-chloro-2-allyl-3,3,4,4,5,5-hexafluorocyclopentan-1-one from 1,2-dichlorohexafluorocyclopentene-1

One mole (forty grams) of sodium hydroxide pellets was dissolved in one hundred milliliters of water, and added to a mixture of one mole (two hundred and forty-five grams) of 1,2-dichlorohexafluorocyclopentene-1, and one mole (fifty-eight grams) of allyl alcohol, with stirring at room temperature over a half-hour period. The resultant mixture was stirred for one hour, allowed to stand for two days, and then heated to reflux temperature, at which time the mixture was no longer basic to litmus paper. The aqueous layer was separated, and the organic layer was washed once with one hundred milliliters of water and dried over a desiccant and filtered. The resultant product was then fractionated at atmospheric pressure. A fraction of forty grams of unreacted 1,2-dichlorohexafluorocyclopentene-1, boiling at ninety to ninety-one degrees centigrade, and twenty-nine grams of an intermediate cut were recovered in addition to the main product fraction.

The main product fraction was one hundred and eighteen grams of a compound having a boiling point of one hundred and twenty-nine to one hundred and thirty-one degrees centigrade, $n_D^{22}$ 1.3749, and with a characteristic of a carbonyl bond (C=O) at $5.5\mu$, and of a carbon-to-carbon double bond at $6.02\mu$, and both vinyl and saturated carbon. There were no bands between 2100 and 4000 angstroms in the ultraviolet spectrum characteristic of conjugated double bonds. The molecular weight, as determined by vapor density method at one hundred degrees centigrade, was two hundred and sixty-seven plus or minus five percent (calculated for $C_8F_6ClOH_5$=266).

As further proof of the product structure, sixty-eight grams of the above product ($C_8F_6ClOH_5$) and seventy-four grams of hexachlorocyclopentadiene were mixed together and heated to reflux. The temperature rose gradually from one hundred and forty-four degrees centigrade to one hundred and ninety-three degrees centigrade, over a period of 4.5 hours. The ease with which the reaction proceeded substantiates the presence of terminal olefin double bond in the above product ($C_8F_6ClOH_5$). The product was therefore 2-chloro-2-allyl-3,3,4,4,5,5-hexafluorocyclopentan-1-one.

The resultant product was distilled at reduced pressure. A viscous pale yellow liquid distillate boiling at one hundred and seventeen to one hundred and nineteen degrees centigrade at 0.5 millimeter pressure was collected, and the chlorine analysis was 46.3 percent (calculated for $C_{13}Cl_7F_6OH_5$, 46.0 percent chlorine). The resultant compound was, therefore, the Diels-Alder adduct of the $C_8F_6ClOH_5$ starting compound. This adduct is also believed to be a new composition of matter, and has ultility as a chemical intermediate for the preparation of pesticides as demonstrated in Example 8.

EXAMPLE 2

2 - chloro - 2 - allyl - 3,3,4,4,5,5-hexafluorocyclopentan-1-one from 2-chloro - 3,3,4,4,5,5-hexafluorocyclopenten-1-yl allyl ether The reaction of Example 1 was repeated with the exception that the reaction temperature was maintained at twenty-five degrees centigrade by cooling in an ice bath. The organic layer was separated, washed with water and dried. The infrared spectrum of the crude product did not show any absorption characteristic of the carbonyl bond (C=O) at $5.5\mu$, and showed absorption characteristic of the presence of the double bond (C=O) at $6.02\mu$. This indicated the presence of ether 2-chloro-3,3,4,4,5,5-hexafluorocyclopenten-1-yl allyl ether.

Several grams of the crude product were then heated to ninety-four to ninety-eight degrees centigrade. Periodic analysis of the mixture by infrared showed the rearrangement was about eighty-three percent complete in six hours, as evidenced by the appearance of absorption at $5.5\mu$, characteristic of the carbonyl group (C=O) of 2-chloro-2-allyl-3,3,4,4,5,5-hexafluorocyclopentan-1-one.

This experiment indicates that the final product, 2-chloro-2-allyl-3,3,4,4,5,5 - hexafluorocyclopentan-1-one, is formed by rearrangement of the reaction product of allyl alcohol with 1,2-dichlorohexafluorocyclopentene-1, when heated to its distillation temperature.

EXAMPLE 3

2-chloro-2-allyl-hexafluorobutan-3-one from 2,3-dichlorohexafluorobutene-2

2,3-dichlorohexafluorobutene-2 (two moles) and allyl alcohol (three moles) were reacted in a manner after Example 1, except that the reaction temperature was kept below twenty-five degrees centigrade. Distillation of the resultant material over a period of two hours gave one hundred and seventy-five grams of unreacted 2,3-dichloro-hexafluorobutene-2, fifty grams of an intermediate fraction, and one hundred and thirty grams of a third fraction having a boiling point of one hundred and nine degrees centigrade, and a chlorine content of 13.3 percent (calculated 13.9 percent). There were characteristic infrared absorption peaks for both C=O and C=C groups. These analyses show the compound is 2-chloro-2-allyl-hexafluorobutan-3-one.

EXAMPLE 4

2-chloro-2-allyl-3,3,4,4,5,5-hexafluorocyclopentane-1-one from 1-chloroheptafluorocyclopentene-1

A solution of forty-five grams of potassium hydroxide pellets in two hundred milliliters of water was added to a mixture of 139.5 grams (0.61 mole) of 1-chloroheptafluorocyclopentene-1 and forty-one grams (0.7 mole) of allyl alcohol with stirring over a half-hour period. The reaction mixture was maintained at twenty degrees centigrade by cooling in an ice bath during the addition. After stirring at twenty to thirty-five degrees centigrade for three hours, the temperature was raised to seventy-five degrees centigrade for a half-hour, at the end of which time the pH of the aqueous layer was seven. The aqueous layer was separated and the organic layer washed twice with water, dried and filtered. The product was isolated by fractionation at atmospheric pressure through an eight inch long column packed with one-eighth inch helices, boiling point one hundred and twenty-nine degrees centigrade, $n_D^{24.5}$ 1.3742, yield one hundred and twenty-two grams (seventy-five percent).

Analysis for $C_8H_5ClOF_6$: percent chlorine theoretical, 13.3. Found: 13.4.

The experiment shows that the allyl alcohol reacts preferentially with the fluorine substituent on the double bond to give the same product as that of Example 1.

EXAMPLE 5

2,3- and 2,5-dichloro - 2 - allyl-pentafluorocyclopentan-1-one from 1,2,3-trichloro - 3,4,4,5,5 - pentafluorocyclopentene-1

A mixture of 1,2,3-trichloro - 3,4,4,5,5 - pentafluorocyclopentene-1 and allyl alcohol was reacted with aqueous potassium hydroxide in a manner similar to Example 4.

The product, 2,3- and 2,5-dichloro-2-allyl pentafluorocyclopentan-1-one was collected at a boiling point of one hundred and fifty-five to one hundred and fifty-eight degrees centigrade $n_D^{25}$ 1.4068, analysis for $C_8H_5Cl_2OF_5$: percent chlorine theoretical 25.1, found 25.4

EXAMPLE 6

2-allyl-2,3,3,4,4,5,5-heptafluorocyclopentane-1-one from 1,2,3,3,4,4,5,5-octafluorocyclopentene-1

A mixture of allyl alcohol and 1,2,3,3,4,4,5,5 - octafluorocyclopentene-1 was reacted with aqueous potassium hydroxide in a manner similar to Example 4

The product, 2-allyl-2,3;3,4,4,5,5-heptafluorocyclopentan-1-one, was collected at a boiling point of one hundred and two degrees centigrade, $n_D^{25}$ 1.3447, and had the characteristic coconut-like odor.

EXAMPLE 7

2-allyl-1,1,1,4,4,4-hexafluorobutan-3-one from 1,1,1,4,4,4-hexafluorobutene-2-yl allyl ether 1,1,1,4,4,4-hexafluorobutene-2-yl allyl ether is prepared by the addition of allyl alcohol to hexafluorobutyne-2 and is heated to the reflux temperature. Fractionation gives 2-allyl-1,1,1,4,4,4-hexafluorobutane-3-one.

It is to be understood that the halogens embraced within the scope of this case are those selected from the group of chlorine and fluorine, and bromine.

EXAMPLE 8

In a manner similar to Examples 1 and 2, 2-chloro-3,3,4,4,5,5-hexafluorocyclopenten-1-yl allyl ether is prepared by employing 1-chloroheptafluorocyclopentene-1 in the place of 1,2-dichlorohexafluorocyclopentene-1.

This ether is isolated and heated to 94 to 98 degrees centigrade resulting in the formation of 2-chloro-2-allyl-3,3,4,5,5-hexafluorocyclopentan-1-one.

EXAMPLE 9

In a manner similar to Examples 1 and 2, 2-bromo-2-allyl-3,3,4,4,5,5-hexafluoro-cyclopentan-1-one is prepared by employing 1,2 - dibromohexafluorocyclopentene - 1 in place of 1,2-dichlorohexafluorocyclopentene-1. The ether intermediate thus produced is 2 - bromo-3,3,4,4,5,5-hexafluorocyclopenten-1-yl allyl ether.

EXAMPLE 10

To demonstrate the utility of the novel compounds of the present invention as chemical intermediates for the preparation of pesticides, the Diels-Alder adduct of hexachlorocyclopentadiene and 2-chloro - 2 - allyl-3,3,4,4,5,5-hexafluorocyclopentan-1-one, which is a compound of the formula: $C_{13}Cl_7F_6OH_5$

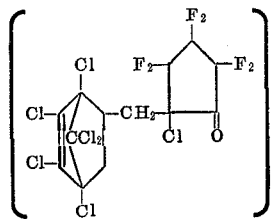

was sprayed in aqueous dispersions on mites at the concentration shown below. The results observed after five days were as follows:

Compound—$C_{13}Cl_7F_6OH_5$
Concentration—0.1 percent by weight
Percent mortality against mites—96

The Diels-Alder adducts of hexachlorocyclopentadiene and the various other compounds of this invention such as 2 - bromo-2-allyl-3,3,4,4,5,5-hexafluorocyclopentan-1-one, 2 - allyl-2,3,3,4,4,5,5-heptafluorocyclopentan-1-one, and 2 - allyl - 3,3,4,4,5,5-hexafluorocyclopentan-1-one, when sprayed in aqueous dispersions on mites in concentrations of from about 2 to about 3 percent, result in similar mortalities after about a 5 day period.

Also, the Diels-Alder adducts of hexachlorocyclopentadiene and various other compounds of the invention such as, 2-chloro-2-allyl-hexafluorobutan-3-one,
2-allyl-1,1,1,4,4,4-hexafluorobutan-3-one,
1-allyl-1-chloro-3,3,4,4,5,5,6,6,6-nonafluorohexan-2-one,
2-chloro-2-allyl-3,3,4,4,5,5,6,6-octafluorocyclohexan-1-2-allyl-1,1,1,4,4-pentachlorobutan-3-one,
2-bromo-2-allyl-hexachlorobutan-3-one,
2-allyl-1,1,1,4,4,4-hexachlorobutan-3-one,
1-allyl-1-bromo-3,3,4,4,5,5,5-heptachloropentan-2-one and
2-fluoro-2-allyl-3,3,4,4,5,5,6,6-octachlorocyclohexan-1-one, when sprayed in aqueous dispersions on mites result in a comparable mortality.

Various modifications to the above description can be made by one of ordinary skill in the art and the invention is not to be limited thereto, except as defined in the appended claims.

What is claimed is:

1. 2-chloro-2-allyl-3,3,4,4,5,5-hexafluorocyclopentan-1-one.

2. The Diels-Alder adduct of hexahalocyclopentadiene and 2-chloro-2-allyl-3,3,4,4,5,5-hexafluorocyclopentan-1-one having an empirical formula $C_{13}Cl_7F_6OH_5$, a chlorine content of about 46.3 percent and a boiling point of one hundred and seventeen to one hundred and nineteen degrees centigrade at 0.5 millimeter of mercury pressure.

References Cited

FOREIGN PATENTS

| | | | |
|---|---|---|---|
| 718,048 | 9/1965 | Canada | 260—586 |
| 1,145,166 | 3/1963 | Germany | 260—614 F |

OTHER REFERENCES

Adams et al.: "Org. Reactions," vol. II, pp. 24, 25 and 29 (1944).

Morrison et al.: "Org. Chem.," pp. 412 to 413 (1959).

Noble: "Octoral Dissert. Series," pub. No. 22, 623 pp. 7, 11 and 12 (1950), Univ. Microfilms, Ann Arbor, Mich.

LEON ZITVER, Primary Examiner

N. MORGENSTERN, Assistant Examiner

U.S. Cl. X.R.

260—63 K, 63 UY, 67 UA, 73 R, 593 H, 598, 601 H, 611 R, 614 R, 614 F, 632 R, 544 L

UNITED STATES PATENT OFFICE
CERTIFICATE OF CORRECTION

Patent No. 3,655,765     Dated April 11, 1972

Inventor(s) Samuel Gelfand

It is certified that error appears in the above-identified patent and that said Letters Patent are hereby corrected as shown below:

Column 1, line 26 "chlorine bro-" should read ---chlorine,bromine---. Column 4, line 34, "carired" should read ---carried---. Column 5, line 40, formula should read

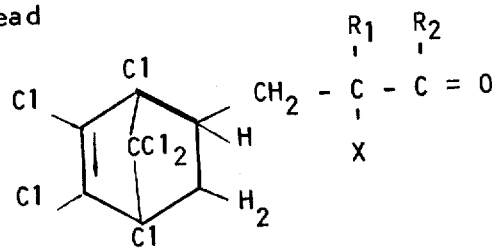

Column 6, line 35, bottom line of formula "-C=C-" should read --- -C-C- ---. Column 7, line 39 "ultility" should read ---utility---. Column 8, line 52, "25.4" should read ---25.4.---; line 59 "Example 4" should read ---Example 4.---.

Signed and sealed this 29th day of August 1972.

(SEAL)
Attest:

EDWARD M. FLETCHER, JR.
Attesting Officer

ROBERT GOTTSCHALK
Commissioner of Patents